(12) United States Patent
Pollen

(10) Patent No.: US 7,242,644 B2
(45) Date of Patent: Jul. 10, 2007

(54) OPTICAL DISK DRIVE, AND A METHOD OF ASSEMBLING IT

(75) Inventor: Rudy Willem Jozef Pollen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 26 days.

(21) Appl. No.: 10/524,407

(22) PCT Filed: Jul. 31, 2003

(86) PCT No.: PCT/IB03/03730

§ 371 (c)(1),
(2), (4) Date: Feb. 11, 2005

(87) PCT Pub. No.: WO2004/017307

PCT Pub. Date: Feb. 26, 2004

(65) Prior Publication Data

US 2005/0265138 A1 Dec. 1, 2005

(30) Foreign Application Priority Data

Aug. 16, 2002 (EP) .................... 02078391

(51) Int. Cl.
*G11B 7/00* (2006.01)

(52) U.S. Cl. ................. 369/44.14; 369/44.16; 720/658; 720/659; 720/681; 720/682; 720/683; 720/685

(58) Field of Classification Search ............ 369/44.14, 369/44.16; 720/658–663, 671, 681–683, 720/685
See application file for complete search history.

(56) References Cited

U.S. PATENT DOCUMENTS

| | | | | |
|---|---|---|---|---|
| 5,023,861 A * | 6/1991 | Champagne et al. | ....... | 720/682 |
| 5,038,240 A * | 8/1991 | Isomura | ................... | 360/99.08 |
| 5,050,154 A * | 9/1991 | Shimozawa et al. | ... | 369/112.23 |
| 5,214,630 A | 5/1993 | Goto et al. | | |
| 5,892,629 A * | 4/1999 | Nishihara et al. | ........... | 359/814 |
| 5,892,747 A * | 4/1999 | Okada et al. | ................ | 720/647 |
| 6,151,284 A * | 11/2000 | Watanabe et al. | ........... | 720/601 |
| 6,320,723 B1 * | 11/2001 | Bernett | .................... | 360/97.02 |
| 6,385,156 B1 * | 5/2002 | Furukawa et al. | .......... | 369/100 |
| 6,831,833 B2 * | 12/2004 | Kim et al. | .................. | 361/690 |
| 2003/0016597 A1 * | 1/2003 | Haruguchi et al. | ....... | 369/44.16 |
| 2003/0112719 A1 * | 6/2003 | Hong et al. | .............. | 369/44.16 |
| 2004/0216152 A1 * | 10/2004 | Ezawa et al. | ................ | 720/659 |

FOREIGN PATENT DOCUMENTS

JP 2001053393 A * 2/2001

* cited by examiner

*Primary Examiner*—Wayne Young
*Assistant Examiner*—Linh T. Nguyen
(74) *Attorney, Agent, or Firm*—Michael E. Belk

(57) ABSTRACT

An optical disk drive includes an optical pick-up unit having a fixed part with at least a light source, and a movable part mounted on a guide. The movable part includes a mirror, a focusing lens, and lens-moving elements. The movable part is adapted to move a focused beam along the disk. A single PCB is provided having a signal connection to the lens-moving elements on the movable part of the pick-up unit though flexible wires. The PCB serves as a mounting base for the fixed part of the optical pick-up unit, the guide, and the drive motor.

16 Claims, 1 Drawing Sheet

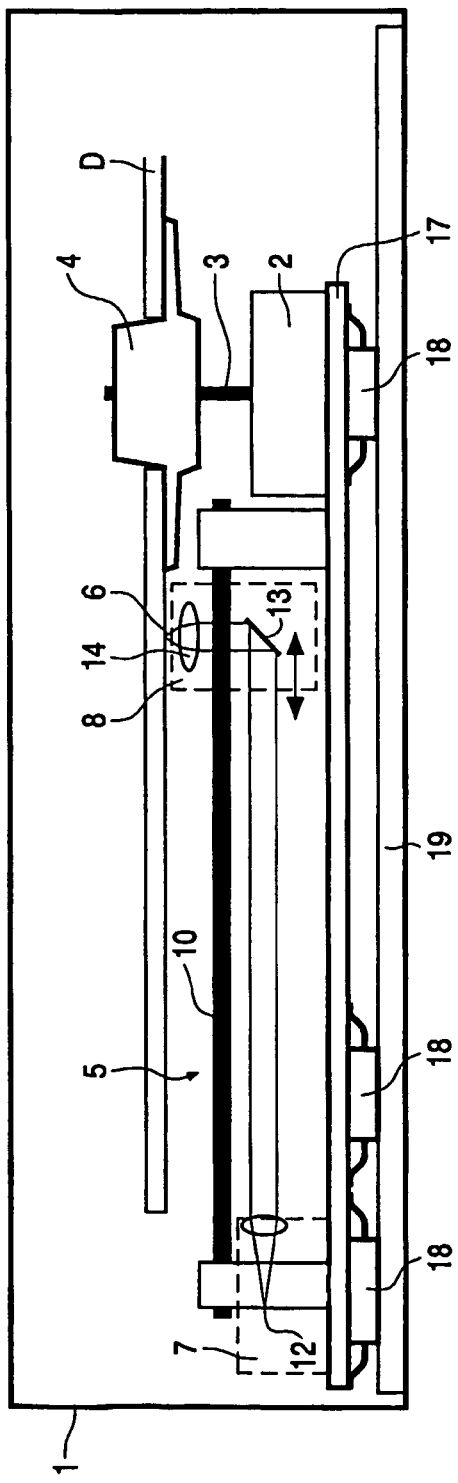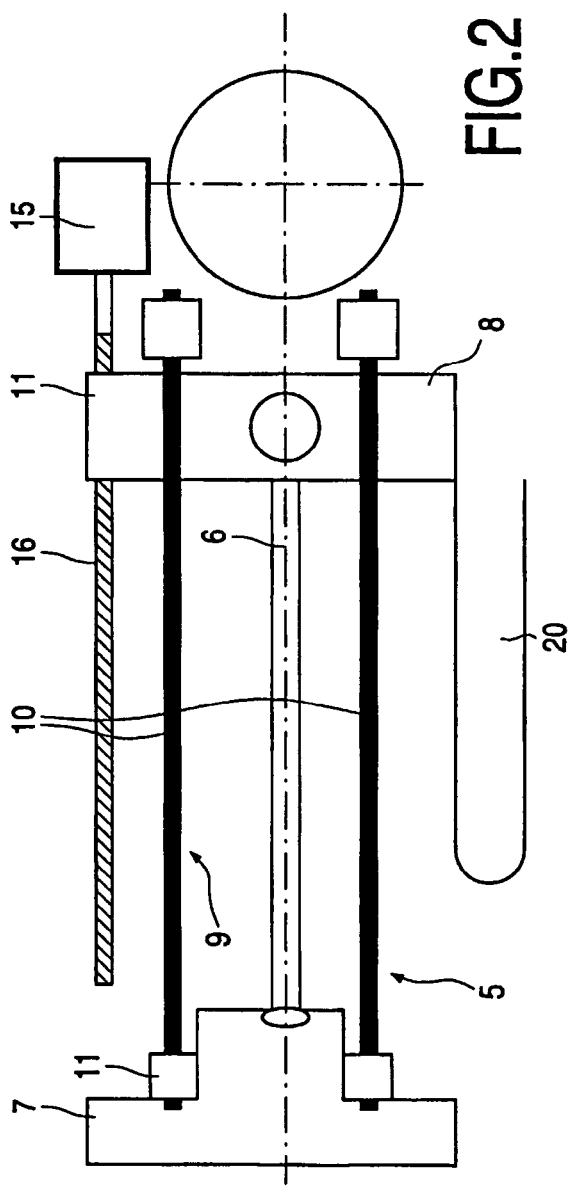

OPTICAL DISK DRIVE, AND A METHOD OF ASSEMBLING IT

The invention relates to an optical disk drive according to the preamble of claim 1.

In the prior art, an optical disk drive generally comprises an optical pick-up unit, a linear guide, a sub-frame, a spring-mounted frame and a disk drive motor. Signals to and from the optical pick-up unit are transmitted to and from a printed circuit board (PCB) through a so-called FLEX connection. This connection conducts read, write, servo, and power signals. The amplitudes and sensitivities of these signals are very different. This leads to crosstalk problems of these signals.

Furthermore, the optical pick-up unit is normally produced in a separate production site. If an optical pick-up unit is built into the optical disk drive in an another production line, assembly tolerances are added to the production tolerances of an optical pick-up unit. This results in a non-negligible percentage of rejects in the production, once after production of the pick unit and once after assembly of the drive. In principle, production tolerances and assembly tolerances can compensate for each other, but due to the testing after production of the pick-up unit this compensation cannot be used since pick-up units will be rejected before compensation can take place.

An embodiment of an optical disk drive according to the preamble of the claim 1 is known, for example, from U.S. Pat. No. 5,214,630. The optical pick-up unit is split into a fixed part comprising the light source and a movable part comprising at least a mirror, focusing lens, and lens-moving elements. The size and weight of the movable part is reduced substantially thereby, so that response times can be reduced as well. Also the flexible signal connection can be simplified.

An object of the present invention is to further improve the optical disk drive of the type referred to in the preamble.

Due to the presence of only one PCB onto which the components are mounted, there is no need for many connectors, which increases the reliability. The connection to the lens-moving means of the pick-up unit remains, but this is not a sensitive connection. Due to the integration of the optical pick-up unit in the production and assembly process, only one final test is necessary which will reduce the percentage of rejects and will simplify test procedures.

Preferably, the PCB comprises electronic components that are mounted to the PCB on a side thereof facing an adjacent housing wall.

The arrangement of the electronic components on a side opposite from the other components, or in other words on the side facing the adjacent housing wall, keeps the heat of the electronic components away from the optical pick-up unit, thereby improving reliability and accuracy. Furthermore, it is easier to remove this heat from the drive unit by conduction, which may obviate the need for a cooling fan. If such cooling fan is not used, no air filter is necessary either. This reduces the cost and creates possibilities for further miniaturization. A further improvement of the removal of heat from the housing is obtained if the PCB is mounted to the housing through heat-conducting mounting means, such as a heat-conducting mat.

An embodiment of the disk drive in which the housing is made of metal not only improves the heat-conducting properties even more, but also improves the EMC shielding. Due to the better heat removal there is no need for large cooling openings in the housing wall, which further improves the shielding effect, both for radiation into and out of the housing.

According to a preferred embodiment, the flexible wires are contained within a wire flex which is bendable about one bending axis only, said bending axis being substantially parallel to the shaft of the drive motor.

This arrangement of the wire flex means that it can be kept away from components which are sensitive to EMC or electrical radiation. It is also renders possible a flatter design of the disk drive.

It is preferred to mount a linear guide for the movable part of the optical pick-up unit directly on the PCB. This greatly simplifies the design. It is made possible due to critical parts being more rigidly mounted on the PCB. The heat-conducting mat, if any, will reduce vibrations if shocks occur. A plastic mat will also serve as a mechanical filter for high frequencies. The use of a fixed part and a movable part for the pick-up unit will reduce the mass of the components around the moving lens, thus increasing the possible servo bandwidth.

The invention also relates to a method of assembling an optical disk drive, comprising the steps of providing a housing, a drive motor, and a drive shaft to be mounted within the housing and adapted to engage the disk for rotating it, an optical pick-up unit comprising a light source, at least a mirror and a focusing lens to create a focused beam, a guide for moving the focused beam along the disk, and a printed circuit board connected to the guide through flexible wires.

According to the invention, first the main electrical components are mounted on one side of the PCB, and then the slide, the pick-up unit, and the drive motor are mounted on the opposite side of the PCB.

This will simplify the assembly of the disk drive unit since it is not necessary anymore to turn the PCB over. It further reduces assembly tolerances since all mechanical and optical parts are mounted from one side.

The invention will be explained in more detail with reference to the drawings showing an exemplary embodiment of the optical disk drive according to the invention in a very schematic way.

FIG. 1 is a very schematic sectional side view of an optical disk drive according to the invention.

FIG. 2 is a very schematic plan view of the drive of FIG. 1.

The drawing very schematically shows an optical disk drive for reading and or writing an optical disk D. The optical disk may be of any type, for example CD, CD-ROM, DVD or the like, which are readable or writable. The optical disk drive is thus for recording and/or reproducing information on the information track of the optical disk D.

The optical disk drive comprises a housing, very schematically indicated with reference numeral 1, for accommodating components of the disk drive. Preferably, the housing 1 is made of metal. The housing 1 has a closable opening (not shown) for introducing and removing the disk D into and from the disk drive.

Within the housing 1 there is mounted a drive motor 2 having a drive shaft 3 and a hub 4 for receiving the disk D thereon in order to allow the disk D to be rotated by the drive motor 2.

The housing 1 further contains an optical pick-up unit (OPU) 5 adapted to read information from or write information on the optical disk D by means of a focused light beam 6. According to the invention, the optical pick-up unit 5 comprises a fixed part 7 and a movable part 8. The fixed part 7 is mounted in stationary position, whereas the movable part 8 is movable so as to move the focused light beam 6 along the surface portion of the disk D containing information. In the case as shown, the movable part 8 is movable in radial direction with respect to the disk D by means of a linear guide 9 comprising guide rails 10 and supports 11.

The fixed part 7 of the optical pick unit 5 comprises means for producing the light beam 6, such as a (laser) light source and peripherals. It also comprises means for receiving the beam of light reflected from the disk D. The output signal of the receiving means is used for reproducing the information on the disk D and also for controlling the focused beam 6.

The movable part 8 of the optical pick-up unit 5 comprises a mirror 13 for reflecting the light beam 6 and the reflected light beam through 45° and further comprises a focusing lens 14 and actuator means (not shown) in order to move the lens 14 to properly direct and focus the beam 6 on the optical disk D.

In order to move the movable part 8 along the linear guide 9, i.e. to act as a slide along the guide rails 10, a micro stepping motor 15 is provided operatively connected to the movable part 8 through a threaded spindle 16. Alternative driving and transmission means are obviously equally conceivable.

As is clearly shown in FIG. 1, the drive motor 2, the fixed part 7 of the optical pick-up unit 5, and the supports 11 of the linear guide 9 of the movable part 8 of the optical pick-up unit 5 are mounted on a single printed circuit board (PCB) 17. Thus, the printed circuit board 17 not only accommodates electronic components and connections to provide for the electronic control, but also forms a mounting base for the main parts of the disk drive unit. The stepping motor 15 is also mounted on PCB 17.

The main electronic components 18 of the PCB 17 are mounted on the side of the PCB 17 facing the adjacent wall of the housing 1, i.e. opposite to the optical means and the drive means for the disk D. The heat of these electronic components can be dissipated by a heat conducting (plastic) mat 19 onto which the PCB is mounted. The heat can be effectively removed from the interior of the disk drive through this mat 19 and the metal wall of the housing 1.

The PCB 17 and the lens actuators on the movable part 8 of the optical pick-up unit 5 are electrically and electronically connected through flexible wires combined in a wire flex 20. This wire flex 20 is flexible in one direction only and, according to the invention, the wire flex 20 is bendable about an axis substantially parallel to the drive shaft 3 of the drive motor 2 as shown in FIG. 2. The wire flex 20 may be very simple and may contain as many as four wires which conduct signals of similar magnitudes, thereby reducing or preventing crosstalk problems.

Assembly of the PCB 17 and components is as follows. First of all, electronic components 18 are mounted to the lower side of the PCB 17. Then the drive motor, the supports 11 with guide rails 10 and movable part 8 and the fixed part 7 are mounted on the upper side of the PCB 17. Finally there is one soldering step in which all connections between the components and the PCB 17 are made. Due to this way of assembling, it is not necessary to turn the PCB 17 over during production, while the addition of tolerances are prevented. It requires only one final measurement for testing.

From the foregoing it will be clear that the invention provides an optical disk drive which is simple, reliable and robust, and which has a high performance and a longer lifetime. The method of assembling the optical disk drive leads to a lower percentage of rejects.

The invention is not restricted to the above-described embodiment as shown in the drawing, which can be varied in several ways without departing from the scope of the invention.

The invention claimed is:

1. An optical disk drive, comprising:
   a housing;
   a drive motor and a drive shaft mounted within the housing and adapted to engage and rotate a disk;
   an optical pick-up unit, including a fixed part and a movable part moveable along a guide and adapted to move a focused beam along the disk;
   a printed circuit board
   for mounting the fixed part, the guide, and the drive motor; and
   a wire flex connected between the printed circuit board and the movable part, the wire flex being bent about one bending axis only, said bending axis being substantially parallel to the drive shaft.

2. The optical disk drive as claimed in claim 1, wherein the printed circuit board accommodates electronic components which are mounted to the printed circuit board on a side thereof facing an adjacent housing wall.

3. The optical disk drive as claimed in claim 1, further comprising heat conducting mounting means, wherein the printed circuit board is mounted to the housing through the heat-conducting mounting means.

4. An optical disk drive, comprising:
   a housing;
   a drive motor and a drive shaft mounted within the housing and adapted to engage a disk for rotating it,
   an optical pick-up unit, including a fixed part comprising at least a light source, and a movable part slideably mounted on a guide and comprising at least a mirror, a focusing lens, and lens-moving elements, said movable part being adapted to move a focused beam along the disk, and
   a printed circuit board having a signal connection to the lens-moving elements on the movable part of the pick-up unit through flexible wires,
   wherein the printed circuit board serves as a mounting base for the fixed part of the optical pick-up unit, the guide, and the drive motor,
   and wherein the flexible wires are contained within a wire flex which is bent about one bending axis only, said bending axis being substantially parallel to the drive shaft of the drive motor, the wire flex bending about the bending axis during operation.

5. The optical disk drive as claimed in claim 1, wherein the guide for the movable part of the optical pick-up unit is mounted directly on the printed circuit board.

6. The optical disk drive as claimed in claim 1, wherein the housing is made of metal.

7. The optical disk drive as claimed in claim 1, wherein the movable part of the pick-up unit comprises an actuator having driving coils for a focusing lens of the movable part, said driving coils being connected to the printed circuit board through said wire flex.

8. A method of assembling an optical disk drive, comprising the acts of:
   providing a housing, a drive motor, and a drive shaft to be mounted within the housing and adapted to engage disk for rotating the disk, an optical pick-up unit, comprising a light source, and a movable part including at least a mirror and a focusing lens to create a focused beam, a guide for moving the focused beam along the disk, and a printed circuit board having main electrical components and being connected to the guide through flexible wires, mounting the main electrical components on one side of the printed circuit board, then mounting the guide, the pick-up unit, and the drive motor on another side of the printed circuit board which is opposite the one side, and mounting a wire flex between the printed circuit board and the movable part, the wire flex being bent about one bending axis only, said bending axis being substantially parallel to the drive shaft.

9. The method as claimed in claim 8, further comprising the act of soldering the drive motor, the pick-up unit, the guide and the main electrical components to the printed circuit board.

10. The optical disk drive of claim 3, wherein the heat-conducting mounting means includes a heat-conducting mat.

11. The optical disk drive as claimed in claim 1, further comprising heat conducting mounting means that extends between the printed circuit board and the housing.

12. The optical disk drive as claimed in claim 1, wherein the fixed part of the optical pick-up unit, the guide, and the drive motor are directly mounted on the printed circuit board by soldering.

13. The method of claim 8, wherein a fixed part of the optical pick-up unit, the guide, and the drive motor are directly mounted on the printed circuit board by the soldering act.

14. The method of claim 8, further comprising the act of providing a heat conductor between the printed circuit board and the housing.

15. The method of claim 8, further comprising the act of mounting the printed circuit board to the housing through a heat conductor.

16. The method of claim 8, wherein the housing is made of metal.

* * * * *